Dec. 23, 1941.  J. A. PERKINS  2,266,902
DISH WASHER
Filed Jan. 9, 1939  2 Sheets—Sheet 1

Inventor:
James A. Perkins.
By: Tefft & Tefft
Att'ys.

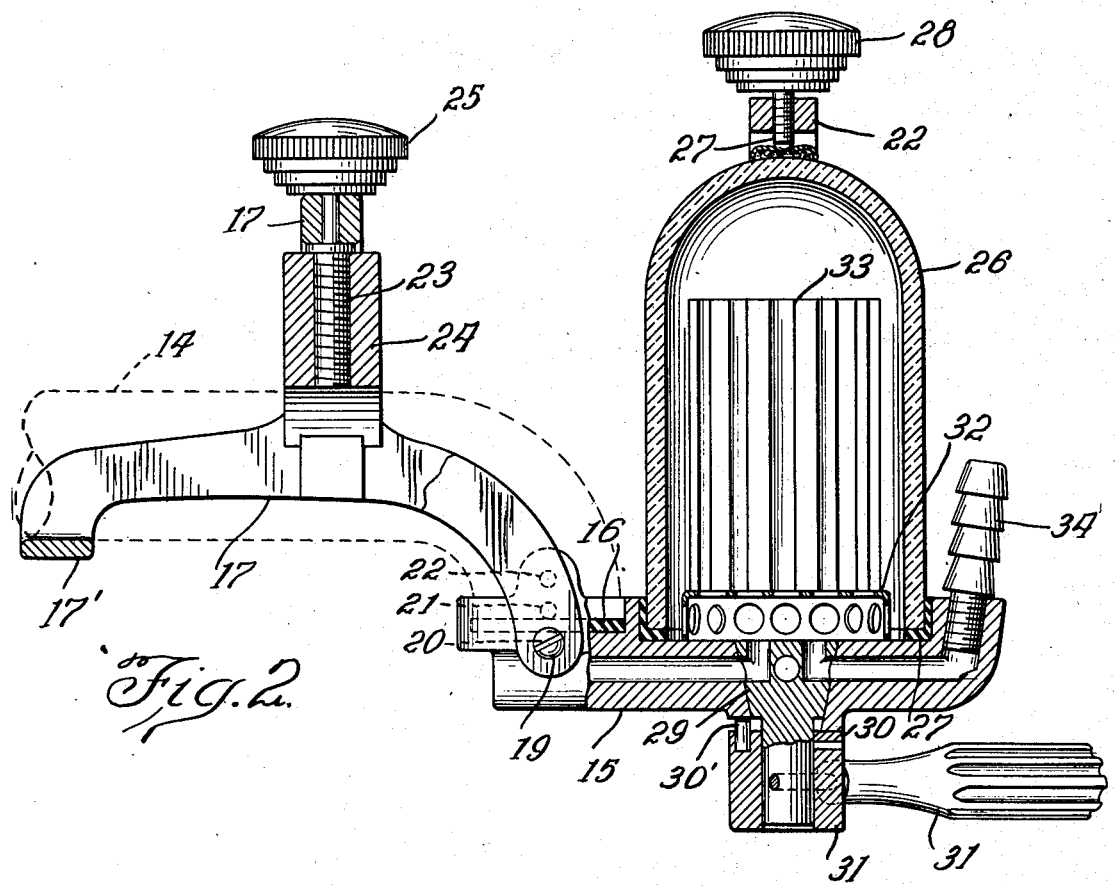
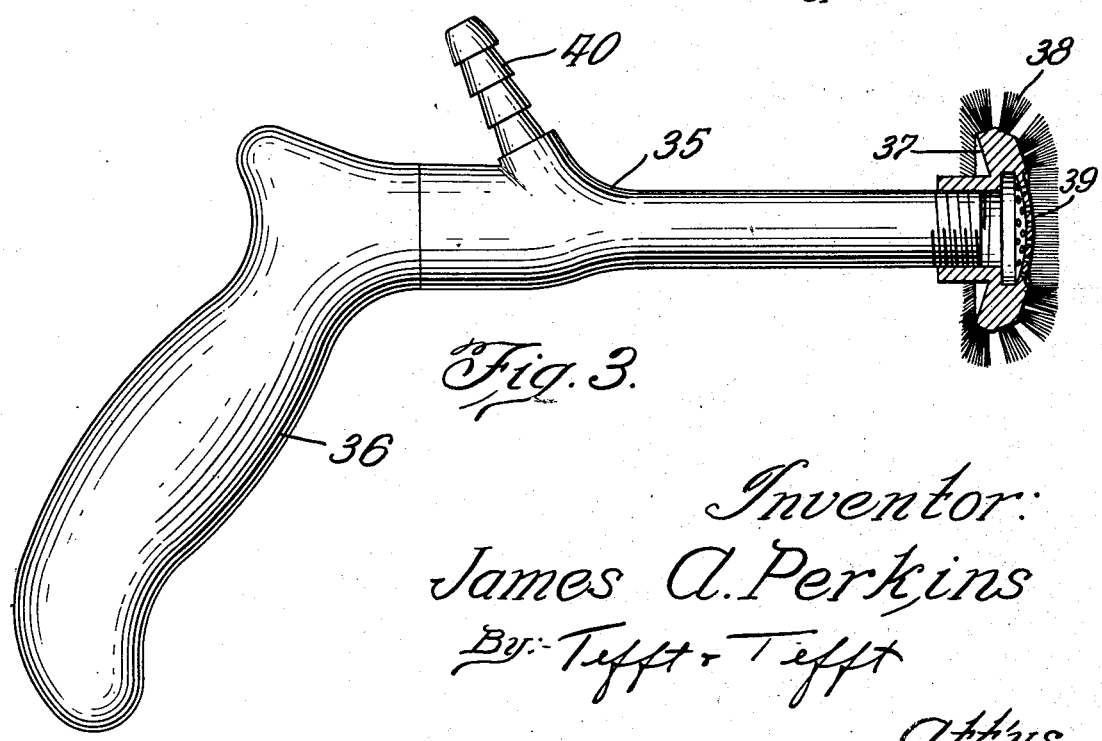

Patented Dec. 23, 1941

2,266,902

UNITED STATES PATENT OFFICE 2,266,902

DISH WASHER

James A. Perkins, Longmeadow, Mass.

Application January 9, 1939, Serial No. 249,853

2 Claims. (Cl. 299—84)

This invention relates to domestic dish washing apparatus and particularly to a simplified form of such apparatus attachable to the ordinary kitchen sink faucet.

Applicant is aware of the general developments in domestic dish washers and has analyzed their general failure to successfully answer the practical requirements of the dish washer as follows:

1. Machines too large and expensive for the average home.
2. Require too large a supply of hot water.
3. Slow and laborious to use, often requiring more time to fill and clean the machine than normally required to wash the dishes by hand.

Applicant is also aware that many attempts to make a simplified form of dish washing apparatus similar to applicant's device have been made, but such apparatus has failed of success for one or more of the following reasons:

4. Connection of apparatus to sink faucets faulty and troublesome.
5. Control of washing and rinsing solutions absent or awkward and troublesome.
6. Hose and connections bothersome—difficult to replace when worn.
7. Spray apparatus not convenient and easily controlled.
8. Spray nozzle damages dishes.
9. Spray cleaning not effective on pots and pans and hard-to-clean dishes.
10. Apparatus not easily detachable and storable.

The applicant has devised an apparatus for washing dishes which has taken into account all of the above difficulties by means which will later be described in detail.

The particular object of this invention is to provide a domestic dish washing apparatus that is simple, sturdy and effective.

Another object is to provide an apparatus for washing dishes that is quickly and easily attachable to the ordinary sink faucet.

And a still further object is to provide soaping and brush means in combination with water spray means whereby all kinds of dishes and cooking utensils can be washed and rinsed quickly and effectively.

Other objects and benefits will be disclosed in the following descriptions and drawings in which:

Fig. 2 is an enlarged cross-sectional elevation view of the attachment and soap mixing apparatus with the water control valve; and Fig. 3 is an enlarged elevation view of my spray gun with the protective brush-enclosed nozzle shown in section.

Figure 1:
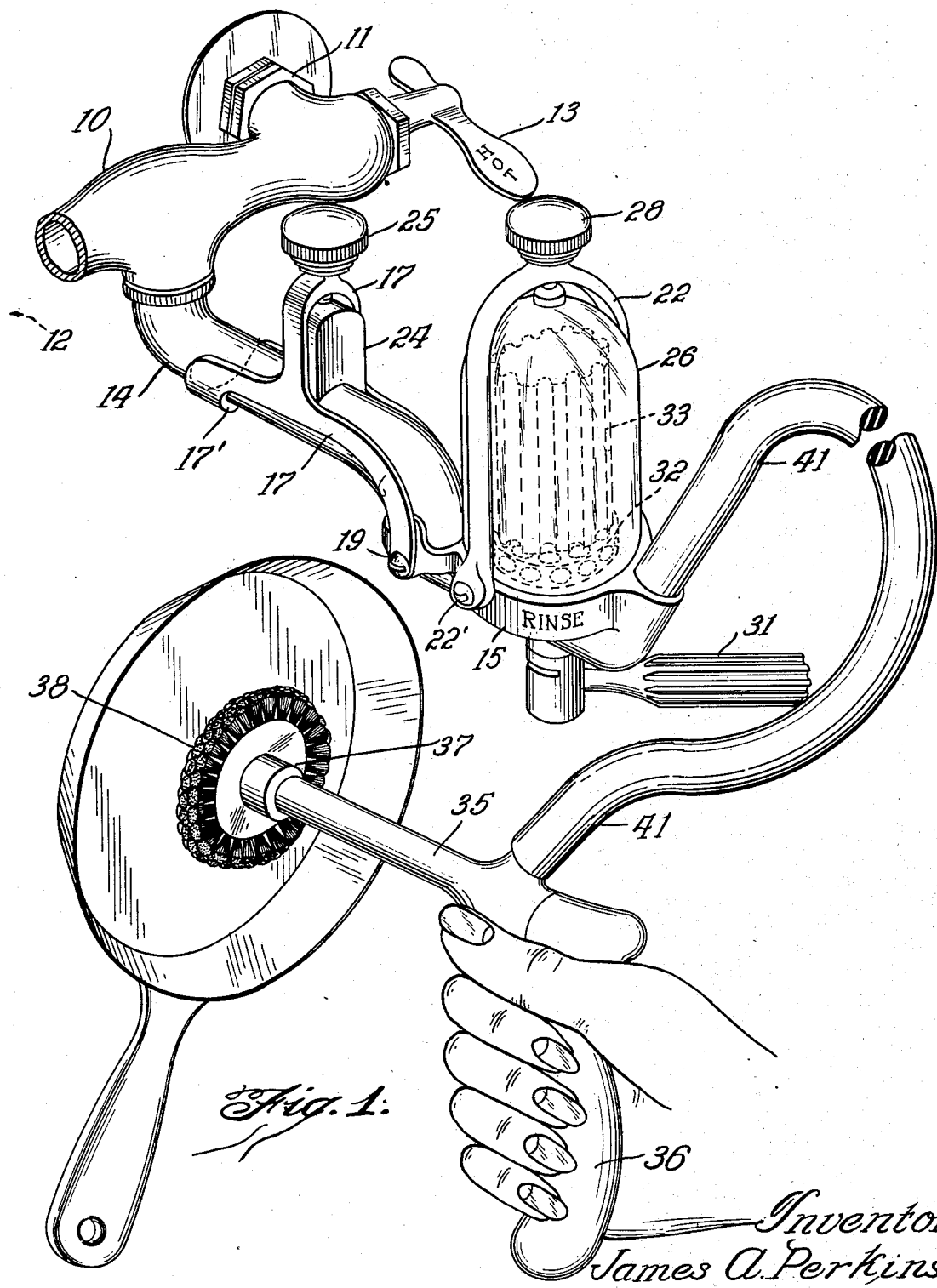
Fig. 1 is a broken general view of my dish washing apparatus attached to an ordinary kitchen sink faucet and showing the brush spray gun applied to a frying pan.

Now referring to the drawings, I designate a conventional dual hot and cold water faucet body by the numeral 10. As is well-known, these faucets have hot and cold water inlets, the hot water inlet being designated by the numeral 11 and the cold water inlet (not shown) by the numeral 12. The water supply is controlled by handles such as 13, the body 10 serving as a mixing chamber whereby water of any desired temperature and volume is obtained by manipulation of the handles. A swinging nozzle 14 attaches to the body 10 and is swingable in a radius to any desired angle. The above description applies to the well-known conventional kitchen sink faucet, all of which follow the same general design. There are some slight variations in dimensions which are taken into consideration by the applicant, as will later be disclosed.

A mixing chamber body 15 is tightly attached to the swinging faucet nozzle 14 by being pressed upwardly against the end of the faucet with a soft rubber gasket 16 interposed between the parts. This pressing action is performed by the attachment member 17 attached to the body 15 by screws 19 through tapped mating holes 20, 21 or 22. This assortment of holes is made in order to adapt the connection to various commercial forms of faucets, and this range of holes is quite effective in accomplishing this result. The body is pulled upward by the screw 23 through the handle 25 actuating the saddle block 24 on the top of the faucet, which co-acts with the section 17′ under the faucet to actuate the body 17′ as a lever upward, thus pulling the body 15 into sealed contact with the bottom base of the faucet by means of the rubber gasket 16. This structure is very effective because of the firm flat contact thus provided being much better than any structure wherein a rubber connector over the faucet nozzle is used, because little, if any, deterioration of the parts results from repeated attachment and detachment of the apparatus.

A soap mixing chamber 26 is affixed on the top of the body 15 through the rubber gasket 27 by being forced downward by the screw 27 actuated by the handle 28 through the hinged U-strap member 22 affixed to the body 15 by the screws 22′. A special kind and form of soap bar 33 is preferably inserted in this mixing dome and stood upon a perforated cap 32 in order to provide proper circulation of water around the soap. The mixing chamber 26 is preferably made of glass so as to permit the operator to see the soap and soap solution within the mixing chamber and to replenish the soap when necessary. However, for cheaper construction this chamber 26 might be made of diecasting with glass windows therein in order to accomplish the same result.

A conventional two-way valve 29 is inserted in the body 15, the same being of the well-known taper-plug construction being held in firm contact with its seat by a spring washer 30 held in position by a handle 31 on the stem of the plug. A pin 30' inserted in the handle 31 controls the turning of the valve 29 to off or on position, that is, to by-pass the water through the mixing chamber 26 or to permit free straight circulation of water to the spray nozzle. As is well shown in Fig. 1, the handle 31 may be thrown either to rinse or soap position at the will of the operator. This two-way valve structure is well-known and with the above explanation, applicant believes that its operation will be completely understood.

Attachment of the rubber hose to the body 15 is provided by the stepped seal nipple 34. It will be noted that this nipple is directed angularly upward for the particular purpose of providing support for the hose 41 in an upward looped arc, as indicated in Fig. 1. Similarly, the stepped seal nipple 40 on the spray gun body is placed in a corresponding angular position for the same purpose. I purposely make the hose of a full rubber compound which although being completely flexible, retains sufficient stiffness in order that it may be held upward and out of the way when the apparatus is in use. I also desire to point out that by using a thick wall full rubber hose, firm sealed connection is made with the body 15 and the spray gun 35 without the use of hose clamps or the like. This is quite advantageous and convenient when the hose must be replaced.

The brush spray gun has a body 35 preferably made of a metal diecasting to which is attached a gun type handle 36 made of Bakelite or similar compound. I have found this gun type of handle to be most convenient, and the handle being made of Bakelite, a non-conductor, the operator is not affected by heat from the hot rinse water when used. On the ends of the gun body 35, as well shown in Fig. 3, is a nozzle member 38 having brush tufts radiating sidewise and endwise, as shown, and completely covering the perforated nozzle disk 39. Although this brush is used as a cleaning means, when necessary, it is also very effective as a protective device preventing metallic contact of the gun nozzle with the dishes. The brush tufts surrounding the nozzle disk 39 are readily and naturally cleaned by the outflowing water through the tufts when the nozzle is held against any object, thereby providing a self-cleaning brush that may always be maintained in sanitary condition.

It will readily be appreciated that by the above structure I have provided a domestic dish washing apparatus that may be quickly, easily and repeatedly attached to a conventional sink faucet for the purpose of washing dishes. The apparatus is small and compact and may be readily and easily tucked away when not in use. At the will of the operator an effective cutting stream of soapy water may be used for washing dishes, which in conjunction with the brush on the end of the nozzle, is very effective in cleaning dishes as well as pots, pans and cooking utensils. By reversing the handle 31, the soap is cut off and clear rinse water may be applied to the dishes, thus effectively providing power rinsing means. As will readily be appreciated, all parts are easily and quickly disassembled, the hose may be replaced, and generally I provide a simple, sturdy structure that may be maintained in good working order indefinitely.

Having thus described my invention, I claim:

1. In a soap mixing device, a body portion having inlet and outlet openings and a relatively small and a relatively large recess formed in the upper surface thereof, said small recess constituting said inlet opening, a water passageway through said body communicating with said inlet and outlet openings and with said large recess, means for removably clamping said body on a faucet, the end of the faucet being adapted to be tightly seated in the small recess, a soap container removably mounted in the large recess, and a valve positioned in the bottom of the large recess constructed and arranged for selectively by-passing water through the soap container or directly to said outlet opening.

2. In a soap mixing device, a body portion having inlet and outlet openings and a relatively small and a relatively large recess formed in the upper surface thereof, said small recess constituting said inlet opening, a water passageway through said body communicating with said inlet and outlet openings and with said large recess, an arm pivotally and adjustably connected to said body engageable with a faucet and a clamp on said arm for demountably attaching said body to the faucet, the end of the faucet being adapted to be tightly seated in the small recess, a soap container removably mounted in the large recess, and a valve positioned in the bottom of the large recess constructed and arranged for selectively by-passing water through the soap container or directly to said outlet opening.

JAMES A. PERKINS.